United States Patent [19]
Seaquist

[11] Patent Number: 5,979,831
[45] Date of Patent: Nov. 9, 1999

[54] SYSTEM AND METHOD FOR ATTACHING A STRUCTURAL COMPONENT TO AN AEROSPACE VEHICLE

[75] Inventor: John D. Seaquist, Long Beach, Calif.

[73] Assignee: McDonnell Douglas Corporation, Seal Beach, Calif.

[21] Appl. No.: 09/104,963

[22] Filed: Jun. 25, 1998

[51] Int. Cl.$^6$ ........................................ B64G 1/00
[52] U.S. Cl. .............. 244/158 A; 244/160; 244/158 R; 244/117 A; 244/131
[58] Field of Search .................... 244/158 R, 160, 244/162, 158 A, 172, 117 A, 131

[56] References Cited

U.S. PATENT DOCUMENTS

| | | | |
|---|---|---|---|
| 3,095,162 | 6/1963 | Keon | 244/1 R |
| 3,282,216 | 11/1966 | Calfee et al. | 244/158 A |
| 3,596,604 | 8/1971 | Corkery | 244/158 A |
| 3,683,100 | 8/1972 | Deal et al. | 174/48 |
| 3,731,893 | 5/1973 | Stalmach, Jr. | 244/160 |
| 3,776,139 | 12/1973 | Léomand | 102/105 |
| 3,785,591 | 1/1974 | Stalmach, Jr. | 244/158 A |
| 3,883,096 | 5/1975 | Osofsky | 244/117 A |
| 4,715,565 | 12/1987 | Wittmann | 244/158 R |
| 4,919,366 | 4/1990 | Cormier | 244/158 R |
| 4,983,151 | 1/1991 | Pires | 475/170 |
| 5,129,990 | 7/1992 | Binnie, Jr. et al. | 244/131 |
| 5,305,973 | 4/1994 | Shortland et al. | 244/117 A |
| 5,743,492 | 4/1998 | Chan et al. | 244/158 R |
| 5,853,149 | 12/1998 | Vo et al. | 244/131 |

Primary Examiner—J. Woodrow Eldred
Attorney, Agent, or Firm—Brooks & Kushman P.C.

[57] ABSTRACT

A system and method for attaching an annular structural component to an aerospace vehicle is provided. The system includes a plurality of fittings circumferentially affixed to an engagement portion of the vehicle, and a plurality of supports. Each support has a first end connected to a corresponding fitting, and a second end having an elongate slot. A flange is configured to extend inwardly from the structural component and into engagement with the second end of each support. The flange has an elongate slot located at each support. Each flange slot is non-parallel to an open communication with each respective support slot. A plurality of pins connects the supports to the flange. Each pin extends through a corresponding flange slot and respective support slot to constrain the structural component, while attaching the structural component to the vehicle during use of the vehicle.

20 Claims, 3 Drawing Sheets

SYSTEM AND METHOD FOR ATTACHING A STRUCTURAL COMPONENT TO AN AEROSPACE VEHICLE

TECHNICAL FIELD

The present invention relates to a system and method for attaching a structural component to an aerospace vehicle.

BACKGROUND ART

Aerospace vehicles such as, for example, the space shuttle, hypersonic vehicles, and hypersonic missiles, typically have a vehicle body with a nose portion which receives a nose cap. Various nose cap attachment systems are known; however, thermal growth of the nose cap causes high stresses at the attachment system connections. Thermal growth of the nose cap structure is particularly apparent in re-entry vehicles, such as the space shuttle.

Similar attachment systems are used in aerospace vehicles to attach other annular structural components in addition to nose caps. Thermal growth of these other annular structural components also causes high stresses at the attachment system connections.

DISCLOSURE OF THE INVENTION

It is, therefore, an object of the present invention to provide an improved system and method for attaching an annular structural component to an aerospace vehicle.

It is another object of the present invention to provide a nose cap and nose cap attachment system for use with an aerospace vehicle.

In carrying out the above objects and other objects and features of the present invention, a system and method for attaching an annular structural component to an aerospace vehicle with a plurality of attachment devices are provided. The system comprises a plurality of fittings circumferentially affixed about an annular engagement portion of the vehicle. The vehicle annular engagement portion receives the structural component. The system further comprises a plurality of supports. Each support has a first end connected to a corresponding fitting, and a second end having an elongate slot. A flange extends inwardly from the structural component and into engagement with the second end of each support. The flange has an elongate slot located at each support. Each flange slot is non-parallel to and in open communication with each respective support slot.

A plurality of first pins connects the plurality of supports to the flange. Each first pin extends through a corresponding flange slot and respective support slot. The assembled system attaches the structural component to the vehicle, while constraining the structural component during use of the vehicle.

In a preferred embodiment, the supports are struts, and a plurality of hinges connects the strut first ends to the corresponding fittings. The hinges are configured such that each strut pivots toward and away from an edge of the vehicle engagement portion near that strut. A first annular seal is secured about the structural component at the flange. A plurality of mounts includes a mount located at each fitting. Each mount has an end with an elongate slot. A second annular seal has an outer sealing portion engaging the first annular seal, and an inner portion having an elongate slot located at each mount. Each inner portion slot is non-parallel to and in open communication with each respective mount slot. A plurality of second pins connects the mounts to the second annular seal. Each second pin extends through a corresponding inner portion slot and respective mount slot to constrain the second seal while maintaining engagement of the first and second seals.

Further, in carrying out the present invention, a combination of a nose cap and a nose cap attachment system for an aerospace vehicle is provided. A plurality of fittings, a plurality of supports with elongate slots, a flange with an elongate slot at each support, and a plurality of pins cooperate to constrain the nose cap while attaching the nose cap to the vehicle during use of the vehicle.

Further, in carrying out the present invention, a method of attaching an annular structural component to an aerospace vehicle is provided. The method comprises affixing fittings about an engagement portion of the vehicle, connecting supports to the fittings, configuring a flange to extend inwardly from the structural component, and connecting the supports to the flange with pins. The pins extend through corresponding flange slots and respective support slots which are non-parallel to and in open communication with each other to constrain the structural component, while attaching the structural component.

The advantages accruing to the present invention are numerous. For example, the present invention provides a system and method for attaching an annular structural component to an aerospace vehicle which constrains the structural component during use of the vehicle. Particularly, the non-parallel slot pairs constrain the structural component via the principle of shared normal load. For a lateral load applied in any direction, the structural component is constrained by a component of the normal force from all attachment devices. Embodiments of the present invention are particularly advantageous for a nose cap attachment system in a re-entry vehicle, such as a space shuttle, in which the nose cap undergoes significant thermal growth during vehicle re-entry.

While embodiments of this invention are illustrated and disclosed, these embodiments should not be construed to limit the claims. It is anticipated that various modifications and alternative designs may be made without departing from the scope of this invention.

BEST MODES FOR CARRYING OUT THE INVENTION

Figure 1:
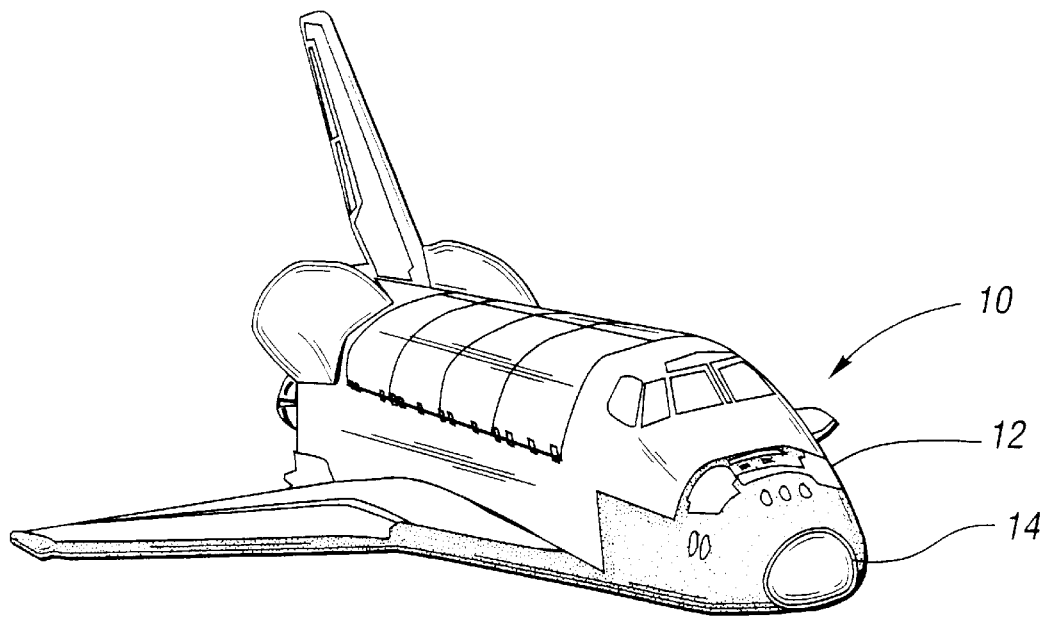
FIG. 1 is an aerospace vehicle of the present invention having a nose cap secured by a nose cap attachment system.

With reference to FIG. 1, a space shuttle is generally indicated at 10. The space shuttle 10 has a nose portion 12.

A nose cap 14 is received by the space shuttle nose portion 12. It is to be understood that embodiments of the present invention have numerous other applications in addition to space shuttle 10. For example, hypersonic vehicles and hypersonic missiles may employ embodiments of the present invention for attaching a nose cap. Further, embodiments of the present invention may be employed to attach other annular structural components to aerospace vehicles, in addition to nose caps.

Figure 2:
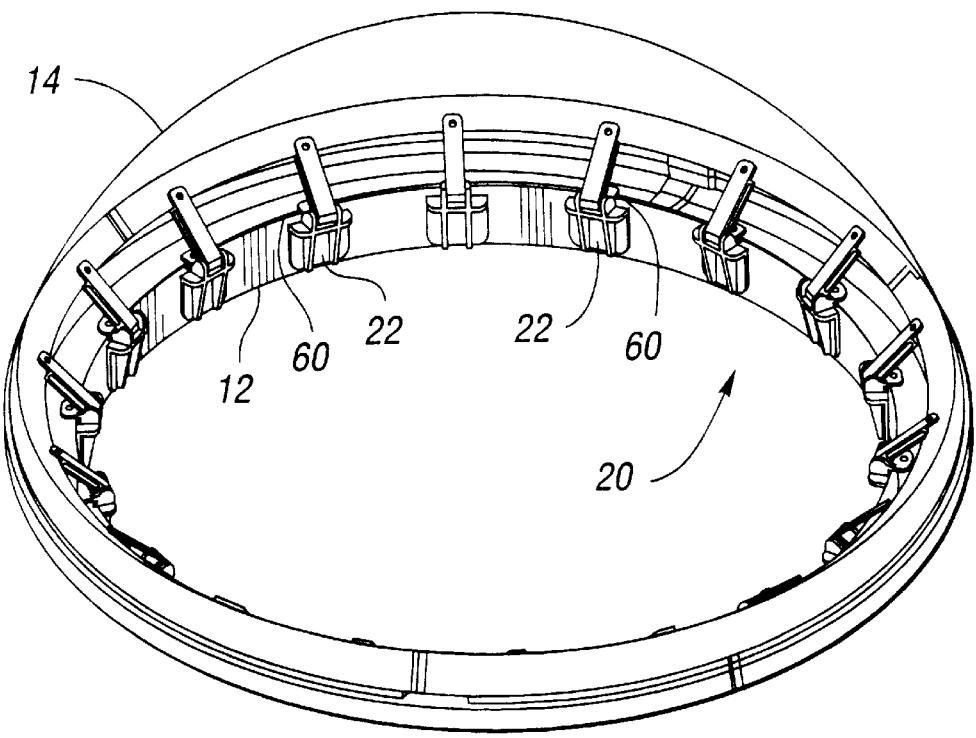
FIG. 2 is a partially cut-away view illustrating the nose cap of the aerospace vehicle of FIG. 1, and the nose cap attachment system which includes a plurality of attachment devices.
Figure 3:
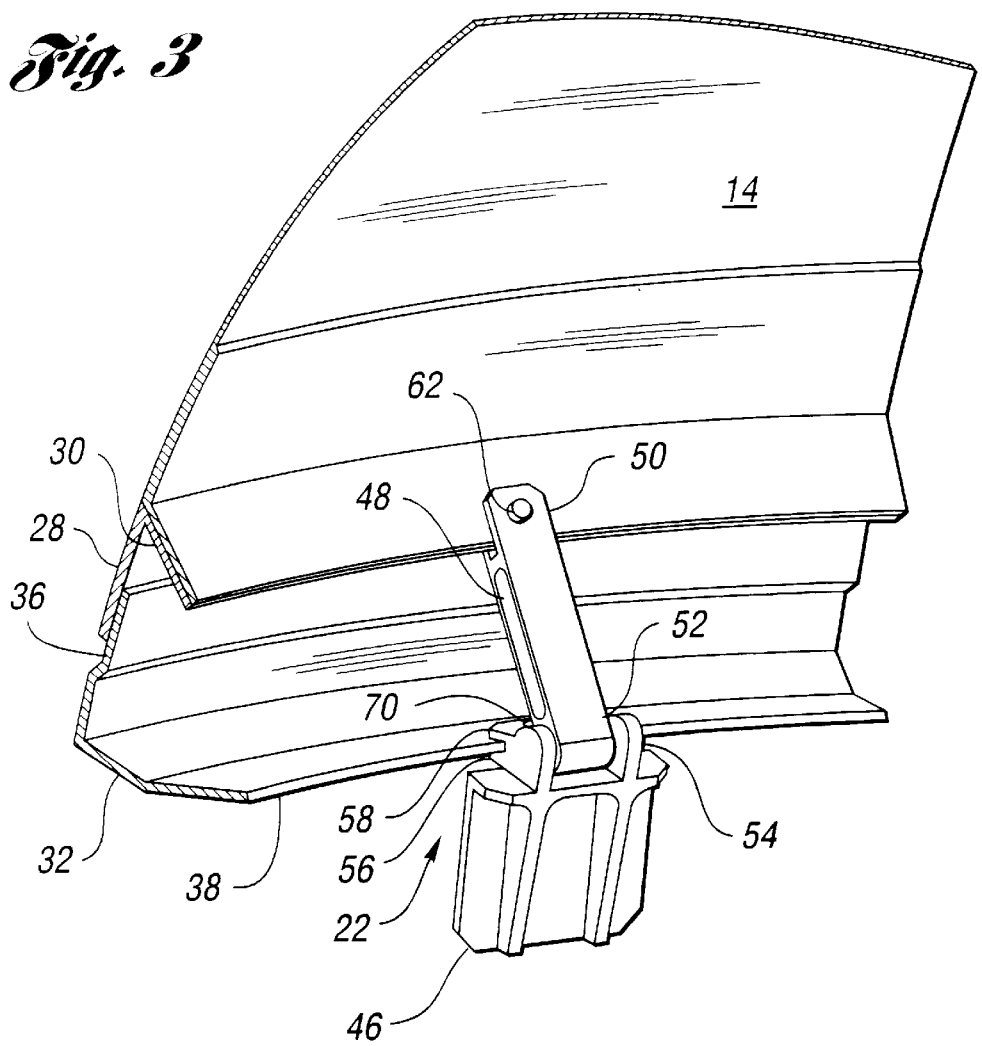
FIG. 3 is an enlarged view of an attachment device of the nose cap attachment system of FIG. 2, showing the device attached to a portion of the nose cap.

With reference to FIGS. 2 and 3, a system for attaching a nose cap to an aerospace vehicle is generally indicated at 20. The system 20 includes a plurality of attachment devices 22. The devices 22 connect the space shuttle nose portion 12 to the nose cap 14. As best shown in FIG. 3, a first annular seal 28, illustrated as a tee seal, is secured about the nose cap 14. The seal 28 is secured to the nose cap 14 at a flange 30 which extends inwardly from the nose cap 14. A second annular seal 32, illustrated as an expansion seal, has an outer sealing portion 36 engaging the first annular seal 28. Second annular seal 32 also has an inner portion 38. Preferably, the nose cap 14, first annular seal 28, and second annular seal 32 are formed of C/SiC.

Each attachment device 22 includes a fitting 46. As best shown in FIG. 2, fittings 46 are circumferentially affixed about the nose portion 12 of the space shuttle 10. A support, preferably a strut 48, is connected to each fitting 46. Each strut 48 has a first end 50 and a second end 52. First ends 50 are connected to fittings 46 at hinges 54. Second ends 52 are connected to the flange 30. Further, each attachment device 22 preferably includes another support, such as mount 56. An end 58 of each mount 56 is connected to second annular seal 32.

A plurality of first pins 62 connects the struts 48 to the flange 30. On each attachment device 22, the second end 52 of strut 48 has an elongate slot 64, which is best shown in FIG. 4.

Figure 4:
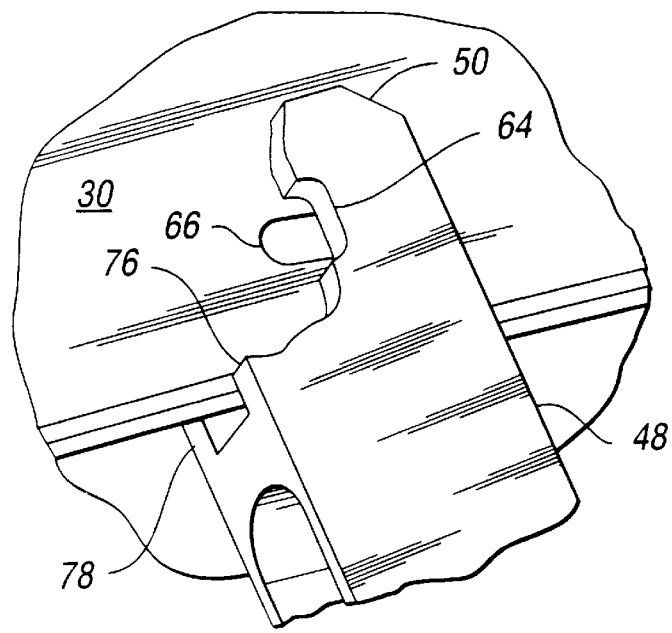
FIG. 4 is an enlarged partially cut-away view of the strut of the attachment device shown in FIG. 3, with the strut engaging the nose cap flange.

With continuing reference to FIGS. 3 and 4, flange 30 has an elongate slot 66 located at each strut 48. The flange slot 66 and corresponding strut slot 64 are non-parallel to and in open communication with each other. For each attachment device 22, a pin 62 extends through the corresponding flange slot 66 and respective strut slot 64 (FIG. 3).

It is to be appreciated that the non-parallel slot pairs allow both radial expansion of nose cap 14 and flange 30, and circumferential expansion of nose cap 14 and flange 30, without producing excessive stresses at the pins 62. Preferably, strut slot 64 extends radially, that is, parallel to the length of strut 48, and flange slot 66 extends circumferentially, that is, perpendicular to strut slot 64. However, it is to be understood that other non-parallel configurations of the flange slots 66 and strut slots 64 may be employed to constrain the nose cap 14 and flange 30.

Figure 5:
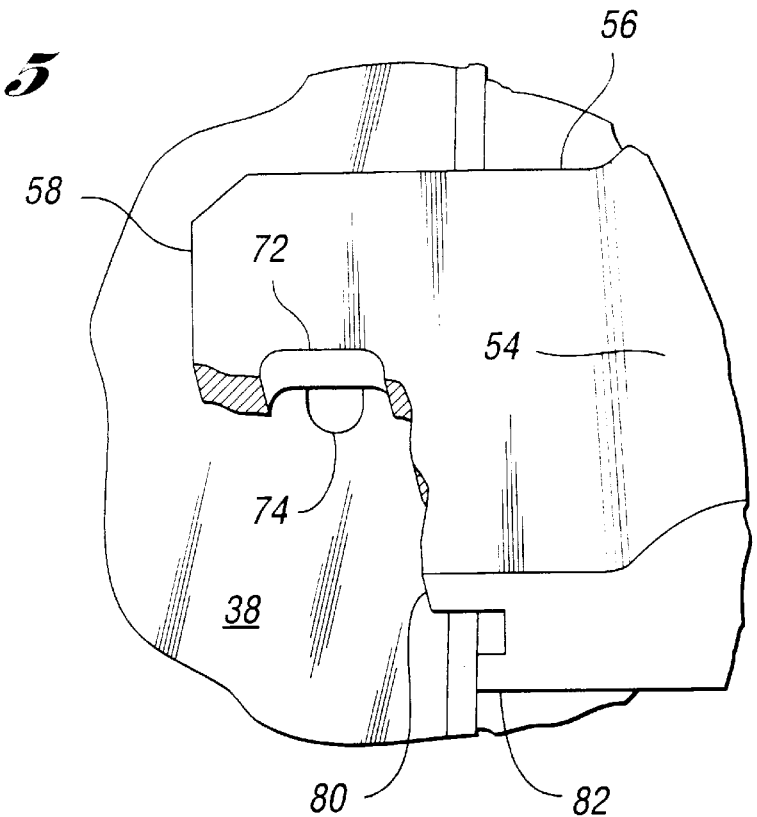
FIG. 5 is an enlarged partially cut-away view of the mount of the attachment device shown in FIG. 3, with the mount engaging an inner portion of the annular expansion seal.

With reference to FIGS. 3 and 5, each mount 56 has a slot 72 at the mount end 58. Inner portion 38 of second annular seal 32 has an elongate slot 74 located at each mount 56. The inner portion slot 74 and mount slot 72 are non-parallel to and in open communication with each other, as best shown in FIG. 5. A plurality of second pins 70 connects the mounts 56 to the second annular seal 32. The pin connections constrain the second seal 32 while maintaining engagement of the first and second seals 28 and 32, respectively, during use of the vehicle.

It is to be appreciated that other non-parallel configurations of inner portion slots 74 and mount slots 72 may be employed to constrain the second seal 32. However, preferably, mount slots 72 extend in a radial direction relative to the vehicle nose portion 12, and inner portion slots 74 extend in a circumferential direction relative to the vehicle nose portion 12, as shown in FIG. 5.

With reference to FIG. 2, in a preferred embodiment of the present invention, the flange 30 extends substantially continuously about the nose cap 14. Alternatively, the flange 30 may comprise a plurality of flange members, with one flange member at each strut 48. Further, preferably, the nose cap 14 is generally spherical so as to undergo isotropic thermal expansion and contraction. Further, in a preferred embodiment, each strut 48 is pivotable toward and away from an edge 60 of the vehicle nose portion 12 near that strut. The pivoting of struts 48 about hinges 54 allows increased expansion and contraction of nose cap 14 and seal 28 during re-entry of space shuttle 10, without producing excessive stresses at first pins 62 or second pins 70. The non-parallel slot pairs constrain the nose cap via the principle of shared normal load. For a load applied in any direction, the nose cap is constrained by a component of the normal force from all attachment devices. Advantageously, the attachment devices 90 degrees offset from the applied load are in substantially full bearing.

Still further, in a preferred embodiment, as best shown in FIGS. 3–5, the strut second ends 52 and the mount ends 58 are forked. Each strut second end 52 includes first and second prongs 76 and 78, respectively (FIGS. 3 and 4). Aligned slots 64 are located on the first and second prongs 76 and 78, respectively. The flange 30 extends between the first and second prongs 76 and 78, respectively. Each mount end 58 includes first and second prongs 80 and 82, respectively (FIGS. 3 and 5). Aligned slots 72 are located on the first and second prongs 80 and 82, respectively. The inner portion 38 of second seal 32 extends between the first and second prongs 80 and 82, respectively.

Alternatively, strut second ends 52 and mount ends 58 may have any number of prongs. The flange 30 and seal inner portion 38 may then be configured accordingly to mate with strut second ends 52 and mount ends 58.

It is to be appreciated that the present invention is not limited to nose caps or to space shuttle applications. Embodiments of the present invention may be employed in any aerospace application requiring a structural component secured to an annular engagement portion of an aerospace vehicle. For example, hypersonic missiles and other hypersonic vehicles may require nose cones and/or other structural components secured to an annular engagement portion of the vehicle.

Figure 6:
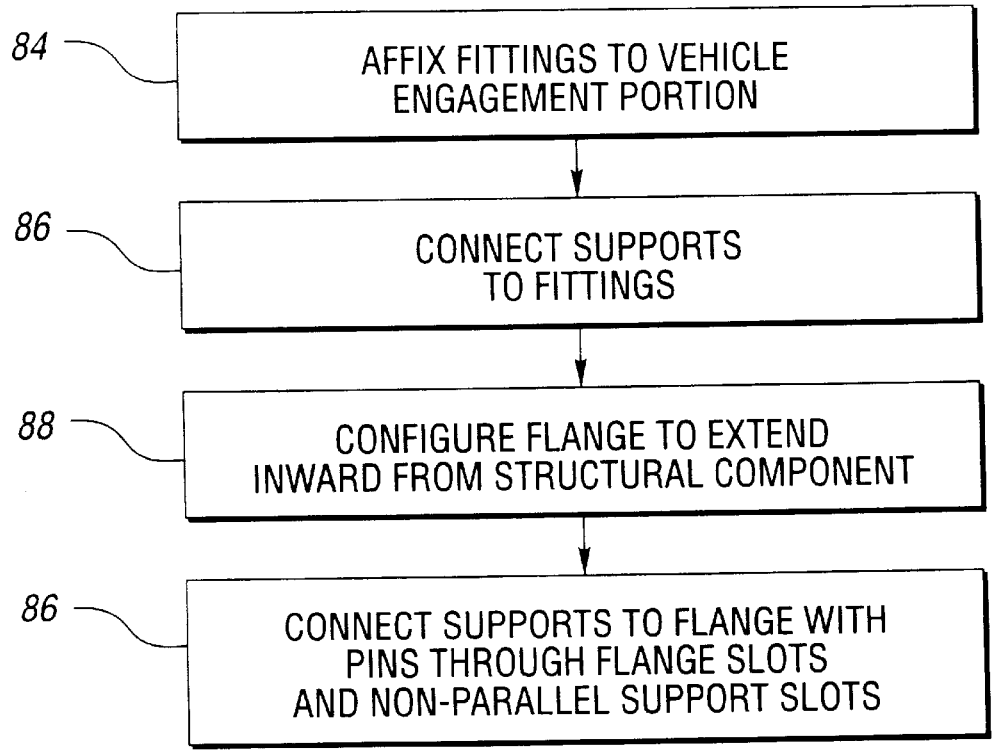
FIG. 6 is a block diagram illustrating a method of the present invention for attaching an annular structural component to an aerospace vehicle.

Referring to FIG. 6, a method of the present invention for attaching an annular structural component to an aerospace vehicle is illustrated. At block 84, fittings are circumferentially affixed about an engagement portion of the vehicle. At block 86, supports, such as struts, are connected to the fittings. Each support has a first end connected to a corresponding fitting and a second end having an elongate slot. At block 88, a flange is configured to extend inwardly from the structural component and into engagement with the second end of each support. The flange has elongate slots located at the supports. Each flange slot is non-parallel to and in open communication with each respective support slot. At block 90, the struts are connected to the flange with pins by positioning the pins to extend through the corresponding flange slots and respective strut slots.

Further, in accordance with a preferred method of the present invention, the supports are struts; and, hinges are positioned between the strut first ends and the corresponding fittings. A first annular seal is secured about the structural component at the flange. The flange is configured to extend substantially continuously about the structural component. A second annular seal is positioned such that the outer sealing portion engages the first annular seal, and the inner portion engages the mounts. The mounts are connected to the inner portion of the second seal by pins extending through corresponding inner portion slots and respective non-parallel mount slots.

In accordance with the present invention, annular components may be attached to an aerospace vehicle by a plurality of supports such as fixed mounts and/or hinged struts, wherein non-parallel slot pairs reduce excessive stresses at the pin connections. For a lateral load applied in any direction, the annular component is constrained by a component of the normal force from all attachment devices. Advantageously, the attachment devices 90 degrees offset from the applied load are in substantially full bearing.

While embodiments of this invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. In combination with a nose cap for an aerospace vehicle, the vehicle having a nose portion which receives the nose cap, a nose cap attachment system comprising:
   a plurality of fittings circumferentially affixed about the nose portion of the vehicle;
   a plurality of supports, each support having a first end connected to a corresponding fitting, and a second end having an elongate slot;
   a flange extending inwardly from the nose cap and into engagement with the second end of each support, the flange having an elongate slot located at each support, each flange slot being non-parallel to and in open communication with each respective support slot; and
   a plurality of first pins connecting the plurality of supports to the flange, each first pin extending through a corresponding flange slot and respective support slot to constrain the nose cap while attaching the nose cap to the vehicle during use of the vehicle.

2. The combination of claim 1 wherein the flange extends substantially continuously about the nose cap.

3. The combination of claim 1 wherein each support second end is forked, and each respective support slot comprises aligned elongate slots on prongs of each respective support second end, and wherein the flange engages each support second end by extending between the prongs of each respective support second end.

4. The combination of claim 1 wherein the plurality of supports are struts, and the combination further comprises:
   a plurality of hinges connecting the strut first ends to the corresponding fittings, the plurality of hinges being configured such that each strut pivots toward and away from an edge of the vehicle nose portion near that strut.

5. The combination of claim 4 further comprising:
   a first annular seal secured about the nose cap at the flange;
   a plurality of mounts, each mount located at a corresponding fitting and having an end with an elongate slot;
   a second annular seal having an outer sealing portion engaging the first annular seal, and an inner portion having an elongate slot located at each mount, each inner portion slot being non-parallel to and in open communication with each respective mount slot; and
   a plurality of second pins connecting the plurality of mounts to the second annular seal, each second pin extending through a corresponding inner portion slot and respective mount slot to constrain the second seal while maintaining engagement of the first and second seals during use of the vehicle.

6. The combination of claim 1 wherein the nose cap is generally spherical in shape.

7. A system for attaching an annular structural component to an aerospace vehicle, the vehicle having an annular engagement portion which receives the structural component, the system comprising:
   a plurality of fittings circumferentially affixed about the engagement portion of the vehicle;
   a plurality supports, each support having a first end connected to a corresponding fitting, and a second end having an elongate slot;
   a flange extending inwardly from the structural component and into engagement with the second end of each support, the flange having an elongate slot located at each support, each flange slot being non-parallel to and in open communication with each respective support slot; and
   a plurality of first pins connecting the plurality of supports to the flange, each first pin extending through a corresponding flange slot and respective support slot to constrain the structural component while attaching the structural component to the vehicle during use of the vehicle.

8. The system of claim 7 wherein each support slot extends in a radial direction relative to the vehicle engagement portion, and each flange slot extends in a circumferential direction relative to the vehicle engagement portion.

9. The system of claim 7 wherein each support second end is forked, and each respective support slot comprises aligned elongate slots on prongs of each respective support second end, and wherein the flange engages each support second end by extending between the prongs of each respective support second end.

10. The system of claim 7 wherein the plurality of supports are struts, and the system further comprises:
    a plurality of hinges connecting the strut first ends to the corresponding fittings, the plurality of hinges being configured such that each strut pivots toward and away from an edge of the vehicle engagement portion near that strut.

11. The system of claim 10 further comprising:
    a first annular seal secured about the structural component at the flange;
    a plurality of mounts, each mount located at a corresponding fitting and having an end with an elongate slot;
    a second annular seal having an outer sealing portion engaging the first annular seal, and an inner portion having an elongate slot located at each mount, each inner portion slot being non-parallel to and in open communication with each respective mount slot; and
    a plurality of second pins connecting the plurality of mounts to the second annular seal, each second pin extending through a corresponding inner portion slot and respective mount slot to constrain the second seal while maintaining engagement of the first and second seals during use of the vehicle.

12. A system for attaching an annular structural component to an aerospace vehicle, the vehicle having an annular engagement portion which receives the structural component, the system comprising:

a plurality of fittings circumferentially affixed about the engagement portion of the vehicle;

a plurality of struts, each strut having first and second ends, each second end having an elongate slot;

a plurality of hinges connecting the strut first ends to corresponding fittings, the plurality of hinges being configured such that each strut pivots toward and away from an edge of the vehicle engagement portion near that strut;

a flange extending inwardly from the structural component and into engagement with the second end of each strut, the flange having an elongate slot located at each strut, each flange slot being non-parallel to and in open communication with each respective strut slot;

a plurality of first pins connecting the plurality of struts to the flange, each first pin extending through a corresponding flange slot and respective strut slot to constrain the structural component while attaching the structural component to the vehicle;

a first annular seal secured about the structural component at the flange;

a plurality of mounts, each mount located at a corresponding fitting and having an end with an elongate slot;

a second annular seal having an outer sealing portion engaging the first annular seal, and an inner portion having an elongate slot located at each mount, each inner portion slot being non-parallel to and in open communication with each respective mount slot; and a plurality of second pins connecting the plurality of mounts to the second annular seal, each second pin extending through a corresponding inner portion slot and respective mount slot to constrain the second seal while maintaining engagement of the first and second seals during use of the vehicle.

13. The system of claim 12 wherein the flange extends substantially continuously about the structural component.

14. An aerospace vehicle comprising:

a body including a nose portion;

a nose cap;

a plurality fittings circumferentially affixed about the nose portion of the vehicle;

a plurality of supports, each support having a first end connected to a corresponding fitting, and a second end having an elongate slot;

a flange extending inwardly from the nose cap and into engagement with the second end of each support, the flange having an elongate slot located at each support, each flange slot being non-parallel to and in open communication with each respective support slot; and a plurality of first pins connecting the plurality of supports to the flange, each first pin extending through a corresponding flange slot and respective support slot to constrain the nose cap while attaching the nose cap to the vehicle during use of the vehicle.

15. The aerospace vehicle of claim 14 wherein each support slot extends in a radial direction relative to the vehicle engagement portion, and each flange slot extends in a circumferential direction relative to the vehicle engagement portion.

16. The aerospace vehicle of claim 14 wherein the nose cap is generally spherical in shape.

17. A method of attaching an annular structural component to an aerospace vehicle, the vehicle having an annular engagement portion which receives the structural component, the method comprising:

affixing fittings circumferentially about the engagement portion of the vehicle;

connecting supports to the fittings, each support having a first end for connection to a corresponding fitting, and a second end having an elongate slot;

configuring a flange to extend inwardly from the structural component and into engagement with the second end of each support, the flange having an elongate slot located at each support, each flange slot being non-parallel to and in open communication with each respective support slot; and connecting the supports to the flange with first pins, each first pin extending through a corresponding flange slot and respective support slot to constrain the structural component while attaching the structural component to the vehicle during use of the vehicle.

18. The method of claim 17 wherein configuring the flange further comprises:

configuring the flange to extend substantially continuously about the structural component.

19. The method of claim 17 wherein connecting supports to the fittings further comprises:

positioning hinges between the support first ends and the corresponding fittings, the hinges being configured such that each support pivots toward and away from an edge of the vehicle engagement portion near that support.

20. The method of claim 19 wherein the supports are struts, and a mount is located at each fitting, each mount having an end with an elongate slot, and wherein the method further comprises:

securing a first annular seal about the structural component at the flange;

positioning a second annular seal having an outer sealing portion and an inner portion with elongate slots, the second annular seal being positioned such that the outer sealing portion engages the first annular seal, and such that the inner portion has an elongate slot located at each mount, each inner portion slot being non-parallel to and in open communication with each respective mount slot; and connecting the mounts to the second annular seal with second pins, each second pin extending through a corresponding inner portion slot and respective mount slot to constrain the second seal while maintaining engagement of the first and second seals during use of the vehicle.

* * * * *